United States Patent
Washington et al.

(10) Patent No.: US 9,310,793 B2
(45) Date of Patent: Apr. 12, 2016

(54) DATA SYNCHRONIZATION IN A COOPERATIVE DISTRIBUTED CONTROL SYSTEM

(75) Inventors: Rodney B. Washington, Raleigh, NC (US); Pierre Colle, Saint Martin d'Uriage (FR)

(73) Assignee: SCHNEIDER ELECTRIC USA, INC., Schaumburg, IL (US)

(*) Notice: Subject to any disclaimer, the term of this patent is extended or adjusted under 35 U.S.C. 154(b) by 859 days.

(21) Appl. No.: 13/419,190

(22) Filed: Mar. 13, 2012

(65) Prior Publication Data

US 2013/0131838 A1     May 23, 2013

(30) Foreign Application Priority Data

Nov. 22, 2011    (FR) .................................. 11 60627

(51) Int. Cl.
    *G05B 19/042*     (2006.01)
    *G05B 15/02*     (2006.01)

(52) U.S. Cl.
    CPC .............. *G05B 19/042* (2013.01); *G05B 15/02* (2013.01); *G05B 2219/2642* (2013.01)

(58) Field of Classification Search
    CPC .. G05B 19/042; G05B 19/0428; G05B 15/02; G05B 19/046; G05B 2219/2642; H04W 84/18; H04W 84/20

See application file for complete search history.

(56) References Cited

U.S. PATENT DOCUMENTS

| | | | |
|---|---|---|---|
| 2003/0151513 A1* | 8/2003 | Herrmann | G08B 25/003 340/573.1 |
| 2003/0218437 A1 | 11/2003 | Bock et al. | |
| 2006/0212175 A1* | 9/2006 | Kim et al. | 700/277 |
| 2009/0015426 A1* | 1/2009 | Long et al. | 340/825.22 |
| 2010/0098102 A1* | 4/2010 | Banks | H04W 52/0235 370/406 |
| 2012/0086568 A1* | 4/2012 | Scott et al. | 340/501 |

FOREIGN PATENT DOCUMENTS

| | | |
|---|---|---|
| EP | 1626532 A2 | 2/2006 |
| EP | 2164276 A1 | 3/2010 |
| JP | 2010048531 A | 3/2010 |

* cited by examiner

*Primary Examiner* — Mohammad Ali
*Assistant Examiner* — Nathan L Laughlin
(74) *Attorney, Agent, or Firm* — Locke Lord LLP (57) ABSTRACT

A data synchronization method and apparatus are provided for a distributed control system where multiple controllers can control a plurality of actuators or sensors. The actuators or sensors are assigned to logical groups that share a common state. One of the actuators or sensors within a logical group serves as a reference device for a state variable. Before taking a control action, the controllers read the current value of the state variable from the reference device. Data synchronization is maintained by one or more refresh master controllers.

7 Claims, 10 Drawing Sheets

DATA SYNCHRONIZATION IN A COOPERATIVE DISTRIBUTED CONTROL SYSTEM

BACKGROUND

The present invention relates generally to control systems for process control, and more particularly, to data synchronization in a cooperative distributed control system where a controlled device, such as actuator or sensor, is controlled by multiple controllers.

A typical feedback control system comprises a single, centralized controller that receives feedback from one or more sensors and generates control signals for one or more actuators in the process. In this type of centralized control system, the control logic is implemented by a single controller with sufficient processing and memory to execute all of the data acquisition and control algorithms for the entire system.

A centralized control system can be easy to create and maintain because all of the control logic is at a single location. However, the processing requirements can be prohibitive if the central controller is expected to implement complex control algorithms, or to execute multiple control algorithms in parallel. Similarly, the bandwidth requirements to implement complex control algorithms may be prohibitive where data needs to be acquired from many remote sensors. Another drawback is that centralized control systems lack inherent robustness due to possible failure of the centralized controller. To ensure robustness, backup controllers may be required to ensure redundancy, which can make centralized control systems expensive to implement.

A distributed control system is a more complex control system where multiple controllers share responsibility for certain control functions. In a distributed control system, there is no single master controller for all control functions, and multiple controllers can exercise control over the same actuator and/or sensor. One example of this type of control system is a residential heating system with multiple heating elements and multiple controllers. The heating elements may be logically grouped into multiple zones. Each zone is independently controlled to maintain the temperature within the zone at a desired temperature set point. Each of the controllers is able to set the operating mode and desired temperature for each zone based on user input. In this example, the controllers need to work together in order to set a single mode and desired temperature for each zone without contention.

Distributed control systems can be scaled more easily than centralized control systems by adding additional controllers to extend the functionality of the control system. Another advantage of distributed control systems is their inherent redundancy. If one controller fails, other controllers are still available to perform the control functions of the failed controller.

In a distributed control system, each controller needs to know the state of the actuator or sensor it controls in order to perform the required calculations for its control function. The controller also needs to be able to set the value of state variables for the actuators and sensors. As an example, a user interface in a residential heating system needs to know the current temperature set point in a zone in order to determine whether heating or cooling should be applied. As another example, the controller may need to know the current temperature set point in order to determine whether the current temperature setting needs to be changed.

Because multiple controllers may be able to change a specific state variable of the actuator or sensor, no controller can assume the current state from the last command it sent to the actuator or sensor. Each actuator or sensor "owns" its current state, and the controller reads the state of the actuator or sensor each time the controller needs the data to perform a control action. In a large system with many controllers, actuators, and sensors, sufficient communication resources need to be provided to avoid congestion, long latency periods, and data throughput issues.

In some control systems, the actuators and sensors may be logically grouped together because they share a common state, such as an operating mode or set point. An inconsistency can cause control system errors and ambiguous control actions. As an example, in a residential HVAC system, the heating and cooling elements within a zone should have the same temperature set point. If the heating elements have a higher temperature set point than the cooling elements, the control system would try to heat and cool the zone simultaneously, with wasteful and ambiguous results. Thus, inconsistency can cause devices within a logical group to work against each other.

An inconsistent state for actuators and sensors within a group can be caused by a communication failure, a device failure, or interlaced commands from multiple controllers to members of the logical group. Because there are multiple controllers, more than one controller could try to change the state of an actuator or sensor at the same time, causing an inconsistency within the group. Inconsistent states can also occur if the number of actuators or sensors within a group change. An actuator or sensor within a group may be temporarily removed before a new state command is set by a controller and then added back after the command has already been sent. An example of this scenario would be when an actuator or sensor is removed to change the battery. Also, a newly-added actuator or sensor may have a different state than other actuators and sensors within a logical group.

Accordingly, there is a need to maintain data synchronization between actuators and sensors in a logical group that share a common state where the state is subject to control by multiple controllers.

SUMMARY

The present invention provides methods and apparatus for data synchronization in a distributed control system where a controlled device, such as actuator or sensor, is controlled by multiple controllers. The actuators or sensors are assigned to logical groups that share a common state. According to a first aspect of the invention, one of the actuators or sensors within a logical group serves as a reference device for a state variable. Before taking a control action, the controllers read the current value of the state variable from the reference device. The assignment of a reference device for the logical group avoids the need to read the value of the state variable from each actuator or sensor within the logical group, thus reducing the signaling overhead. When updating a state variable, the controller sends a command to update the state variable to every actuator and sensor in the logical group.

According to a second aspect of the invention, one of the controllers is designated to serve as a refresh master controller for one or more state variables. The refresh master controller is configured to periodically send a refresh command to each actuator and sensor in the logical group to resynchronize the states of the actuators and sensors. The refresh master controller resolves inconsistencies in the states of the actuators and sensors that may arise during normal operation.

In some embodiments of the invention, the identity of the refresh master controller is stored in memory of the reference device. Before sending a refresh command, a controller queries the reference device to confirm that it is the refresh master controller.

DETAILED DESCRIPTION

Figure 1:
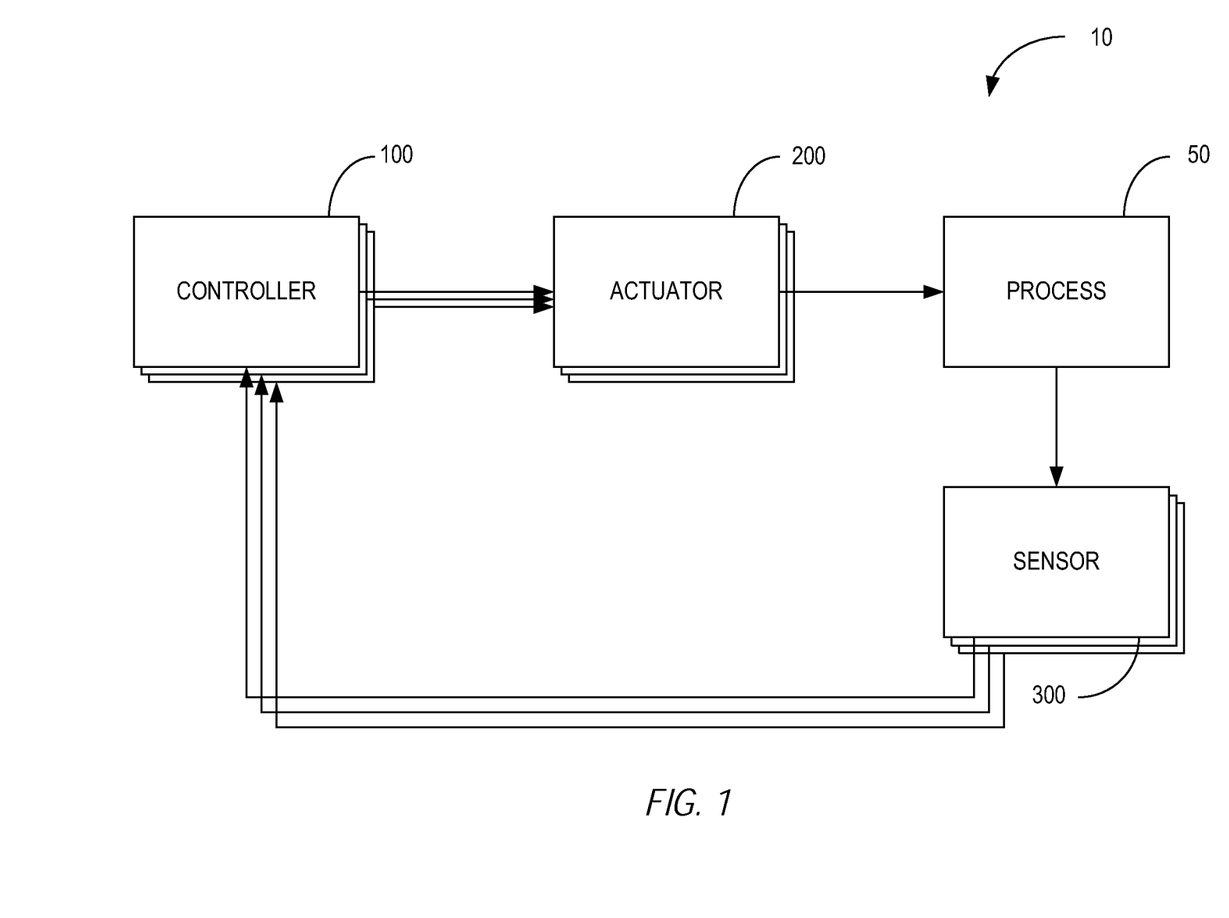
FIG. 1 illustrates a cooperative distributed control system with multiple controllers to control the functions of one or more actuators and sensors.

Referring now to the drawings, FIG. 1 schematically illustrates a cooperative distributed control system indicated generally by the numeral 10. The cooperative distributed control system 10 includes a plurality of controllers 100, a plurality of actuators 200, and a plurality of sensors 300. The controllers 100 share responsibility for controlling a process 50. The sensors 300 provide feedback to the controllers 100 regarding the current state of the process 50. In response to the feedback from the sensors 300, the controllers 100 can generate and send control commands to one or more of the actuators 200 to implement a control algorithm. Typically, the commands are used to set the value of state variables for the actuators 200 and sensors 300. The commands typically include an identifier identifying the controller sending the command, a priority indicator indicating the priority of the controller, a state variable identifier indicating the state variable targeted by the command, and a value for the state variable.

In the cooperative distributed control system 10, each controller 100 acts independently, but coordinates its actions with other controllers 100 to implement the system control functions. Some controllers 100 may be capable of performing all control functions, while other controllers 100 may perform only a subset of the control functions. Thus, some of the control functions may be subject to control by more than one controller 100. Because more than one controller 100 may be responsible for some control functions, there will be command contention and a command arbitration procedure is needed. U.S. patent application Ser. No. 13/418,815 filed Mar. 13, 2012 describes a command arbitration scheme for a cooperative distributed control system. This application is incorporated herein in its entirety by reference.

The actuators 200 and sensors 300 may be assigned to logical groups 400 (FIG. 2) to implement the control functions. The actuators 200 and sensors 300 may be assigned to logical groups 400 responsive to user input at the time of system installation, or after the system installation. As one example, the control system 10 may control a residential HVAC system with multiple zones. Each zone includes heating and air conditioning units to heat and cool the zone respectively. The actuators 200 and sensors 300 for the zone are assigned to a logical group 400 that shares a common temperature set point and mode (e.g. heating or cooling). Each of the controllers 100 is able to set the mode and desired temperature set point for each zone based on user input.

An actuator 200 or sensor 300 may belong to multiple logical groups 400 as shown in Table 1 below. In the example of Table 1, Actuator/Sensor 1 is assigned to Groups 1 and 3, Actuator/Sensor 2 is assigned to Groups 2 and 3, Actuator/Sensor 3 is assigned to Groups 1 and 4, and Actuator/Sensor 4 is assigned to Groups 2 and 4. The common state variable for groups 1 and 2 is Variable A. The common Variable for Groups 3 and 4 is Variable B. The notation "Actuator/Sensor" indicates that the item in question could be either an actuator 200 or a sensor 300.

TABLE 1

| Group Assignments | | |
| --- | --- | --- |
| Actuator/Sensor | Group ID | State Variable |
| 1 | 1 | A |
| 2 | 2 | A |
| 3 | 1 | A |
| 4 | 2 | A |
| 1 | 3 | B |
| 2 | 3 | B |
| 3 | 4 | B |
| 4 | 4 | B |

Figure 2:
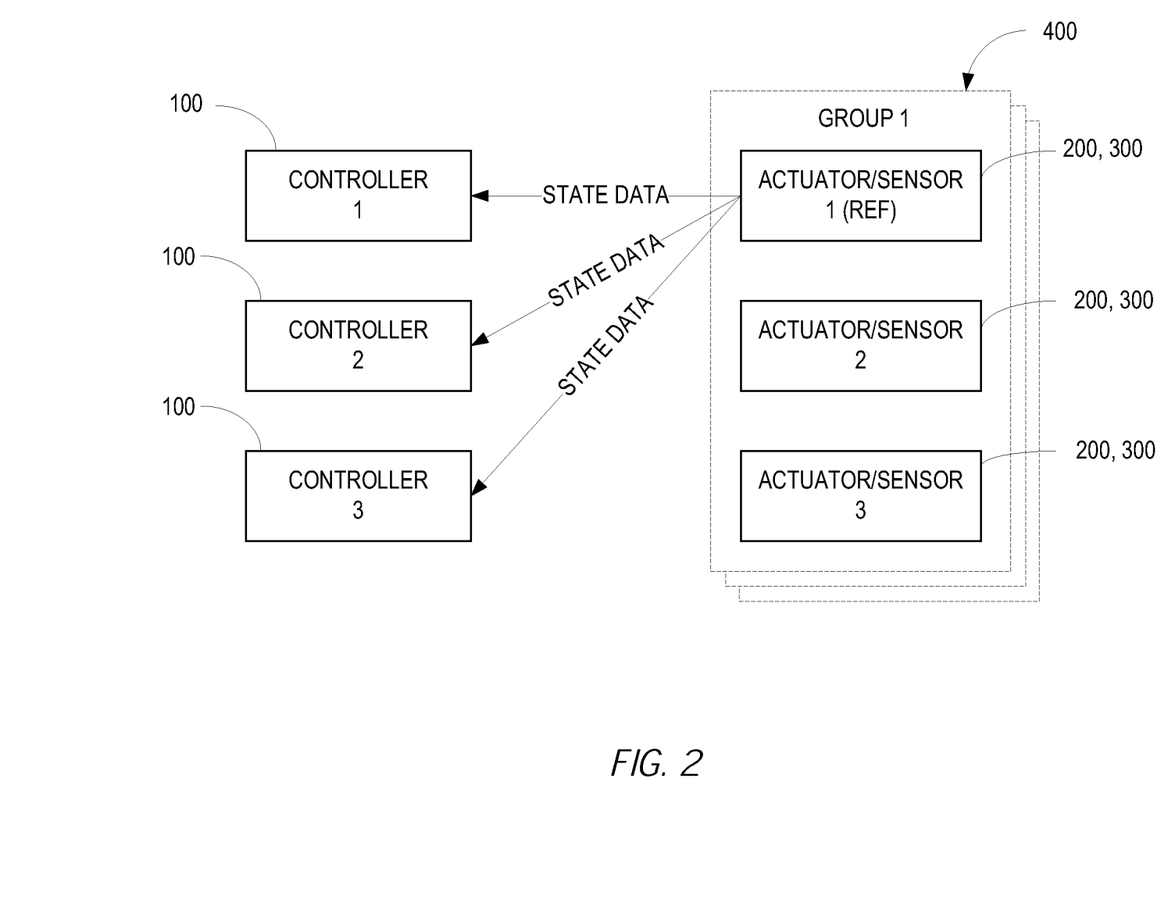
FIG. 2 illustrates a reference device for a logical group of actuators and sensors.

For purposes of maintaining data synchronization, an actuator 200 or sensor 300 within each logical group 400 is selected to serve as a reference device for the logical group 400 for a specific state variable. FIG. 2 illustrates a logical group 400 including Actuator/Sensor 1, Actuator/Sensor 2, and Actuator/Sensor 3. Actuator/Sensor 1 serves as a reference device. The state of each actuator 200 and sensor 300 within the logical group 400 is considered to be the same as the state of the reference device. When one of the controllers 100 needs to perform a control action, the controller 100 reads the current value of the state variable from the reference device. Thus, a single read operation is performed to determine the state of all members of the logical group 400. Using a reference device avoids the need of the controller 100 to read the state of every actuator 200 and sensor 300 within the logical group 400, and reduces the signaling overhead for the control system 10.

The reference device for each logical group 400 must be uniquely identifiable and known to all of the controllers 100. Because each component in a control system 10 must have a unique network address, the actuator 200 or sensor 300 with the lowest network address can be chosen to serve as the reference device for the logical group 400.

Figure 3:
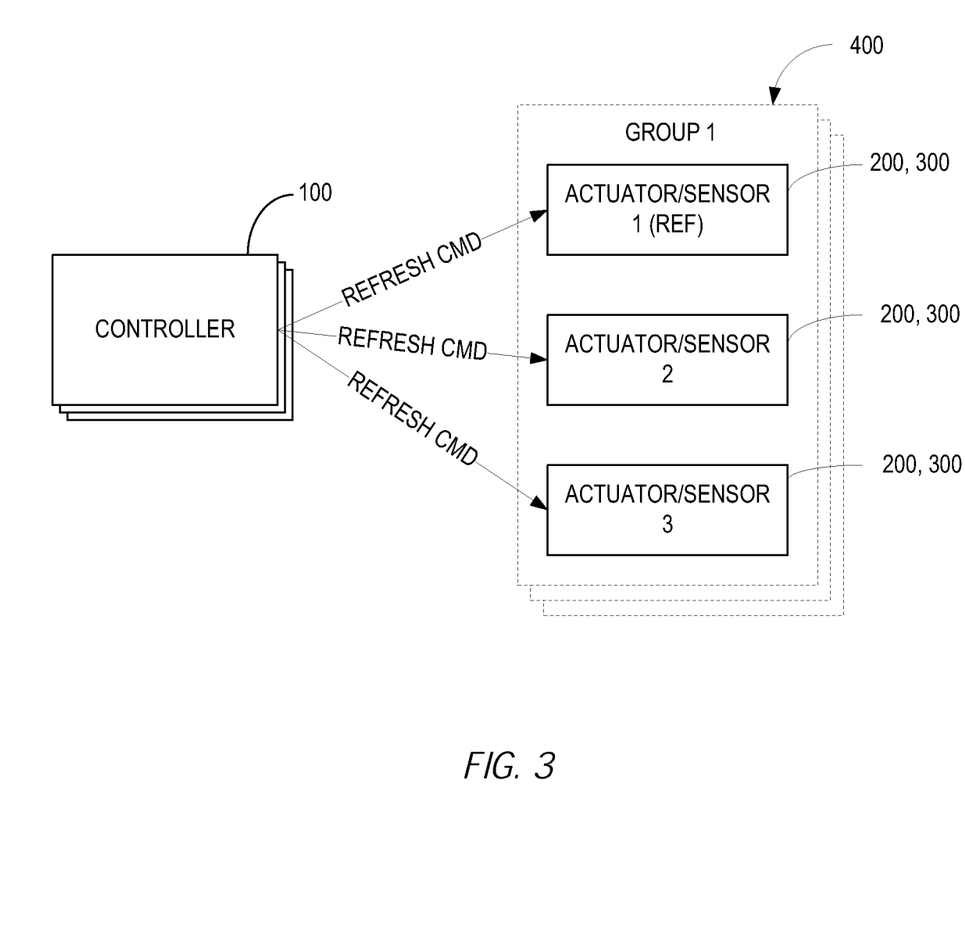
FIG. 3 illustrates a refresh master controller for a logical group responsible for data synchronization.

In order to ensure that the state data for all of the actuators 200 and sensors 300 within the same logical group 400 are consistent, one of the controllers 100 is selected to serve as a refresh master controller. FIG. 3 illustrates a refresh master controller performing a refresh operation. The refresh master controller periodically refreshes or rewrites the current state of each actuator 200 and sensor 300 within a logical group 40 for which it is responsible to maintain data synchronization. Refreshing the state of each actuator 200 and sensor 300 within a logical group 400 resolves consistency problems that may occur during normal operation. For example, a newly added actuator 200 or sensor 300 may have a different state than other actuators 200 and sensors 300 within the same logical group 400. Also, an actuator 200 or sensor 300 within a logical group 400 that is temporarily removed, e.g., to change a battery, may have a different state than other group members due to a change of state while the actuator 200 or sensor 300 was offline. In these cases, the inconsistency is resolved when the refresh master controller refreshes the state of the actuators 200 or sensors 300 within the logical group 400.

The actuators 200 and sensors 300 within a logical group 400 may have multiple independent state variables. A different refresh master controller may be selected for each independent state variable. Also, different state variables may have different reference devices. As an example, in a residential HVAC system, the actuators 200 and sensors 300 within a cooling or heating zone may select one refresh master controller for the mode (e.g., heating or cooling), and a different refresh master controller for the temperature set point. In one exemplary embodiment, the refresh master controller is the last controller 100 to update the state for the logical group 400. When a controller 100 updates a state variable, a Set State command is sent to each actuator 200 and sensor 300 in the logical group 400. The Set State command specifies a state variable and a new value for the state variable. For each state variable, the reference device remembers the identity of the controller 100 that was the last-to-command. Before performing a refresh operation, a controller 100 must verify that it is the refresh master controller. Thus, the reference device arbitrates contention between the different controllers 100 and determines which controller 100 is the refresh master controller.

Figure 4:
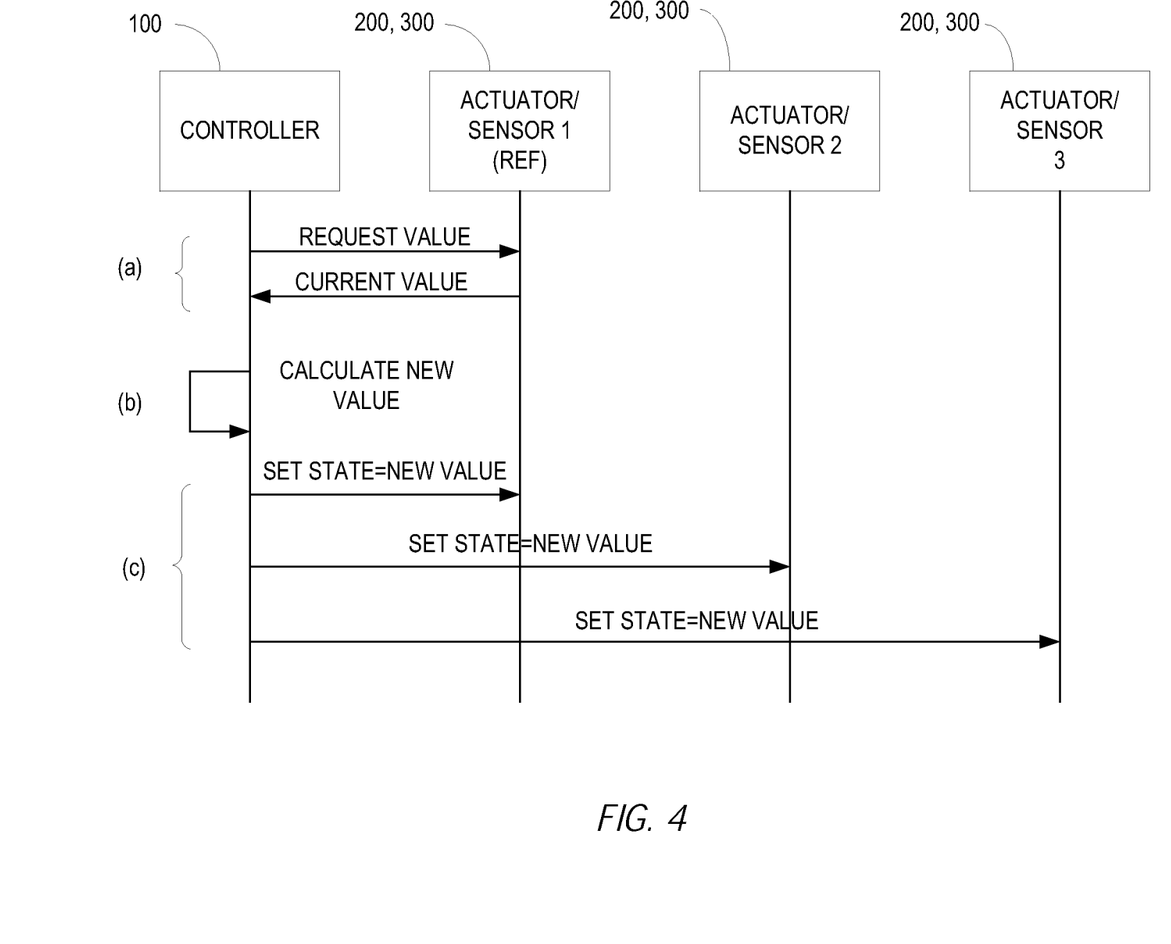
FIG. 4 illustrates an exemplary signaling flow for updating a state variable for a logical group of actuators and sensors.

FIG. 4 illustrates an update procedure performed by a controller 100 to update a state variable for a logical group. Before updating the state variable, the controller 100 needs to determine the current value of the state variable for the logical group 400. As previously noted, the controller 100 fetches the current value of the state variable from the reference device for the logical group (step a). More particularly, the controller 100 sends a request to the actuator 200 or sensor 300. In response to the request, the actuator 200 or sensor 300 returns the current value. The controller 100 then calculates the new value of the state variable (step b). To maintain data synchronization, the controller 100 sends a Set State command to each member of the logical groups (step c). The Set State command indicates the state variable that is the target of the command and the new value of the state variable. Additional information, such as the controller identification may be included in the Set State command. When the Set State command is received by an actuator 200 or sensor 300, the actuator 200 or sensor 300 sets the value of the state variable to the value specified by the Set State command.

Figure 5:
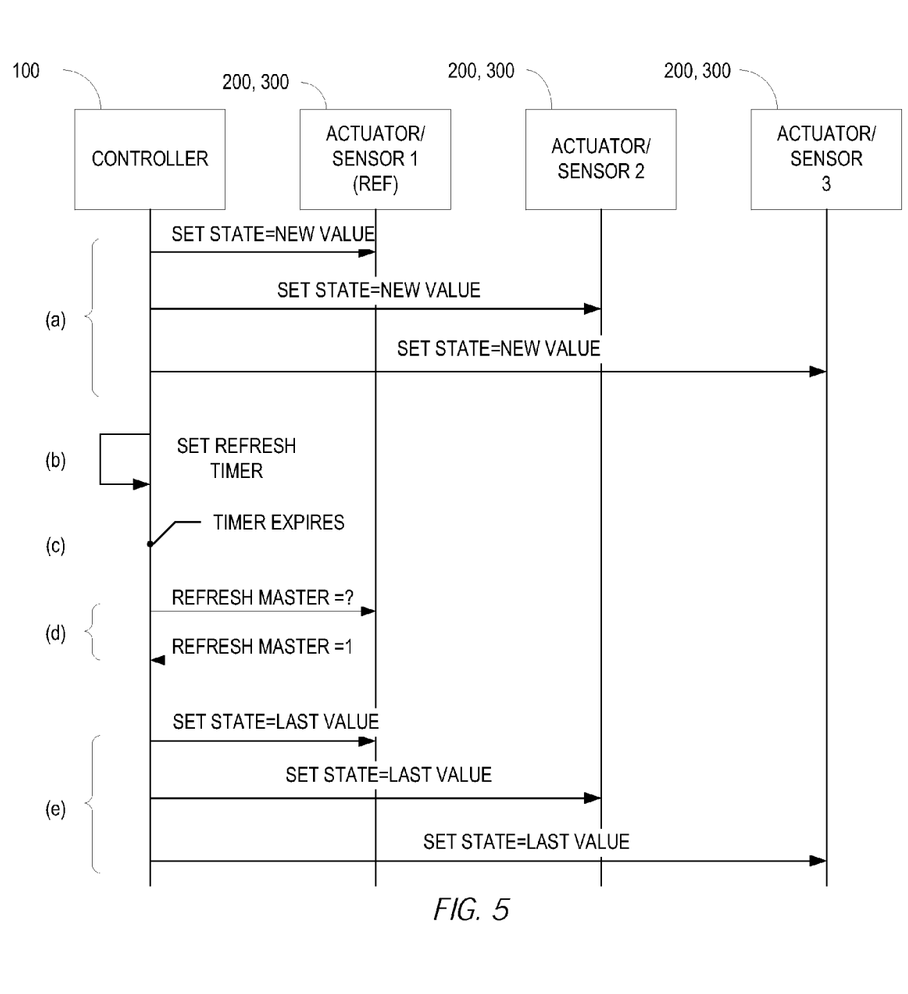
FIG. 5 illustrates an exemplary signaling flow for refreshing a state variable for a logical group of actuators and sensors.

FIG. 5 illustrates an exemplary data refresh sequence. Controller 1 sends a Set State command to each of the actuators 200 and sensors 300 in a logical group 400 to change a state variable (step a). The Actuator/Sensor 1 serves as the reference device for the logical group 400. The Actuator/Sensor 1 remembers the identity of controller 1. After sending the command, Controller 1 sets a refresh timer (step b). When the refresh timer expires (step c), Controller 1 queries the reference device to determine if it is still the reference master for the logical group 400 (step d). The query is needed because another controller 100 may have updated the state variable after Controller 1. When the reference device confirms that Controller 1 is the refresh master (e.g. returns a value of REFRESH MASTER=1), Controller 1 sends commands to each Actuator/Sensor 1, 2, 3 in the logical group 400 to set the value of the state variable to the value specified by the last command sent by Controller 1 (step e).

The data synchronization techniques as herein described enable data synchronization of actuators 200 and sensors 300 in a logical group 400 without direct interaction between the controllers 100. By designating one of the actuators 200 or sensors 300 to serve as a reference device, signaling overhead, congestion, and latency are reduced. The control system 10 can be easily scaled by adding or removing actuators 200, sensors 300, or both, without manual reconfiguration. Additionally, controllers 100 can also be easily added and removed to the system 10. The addition or removal of an actuator 200 or sensor 300 may result in reselection of the reference device for a group 400 by the controllers 100.

Figure 6:
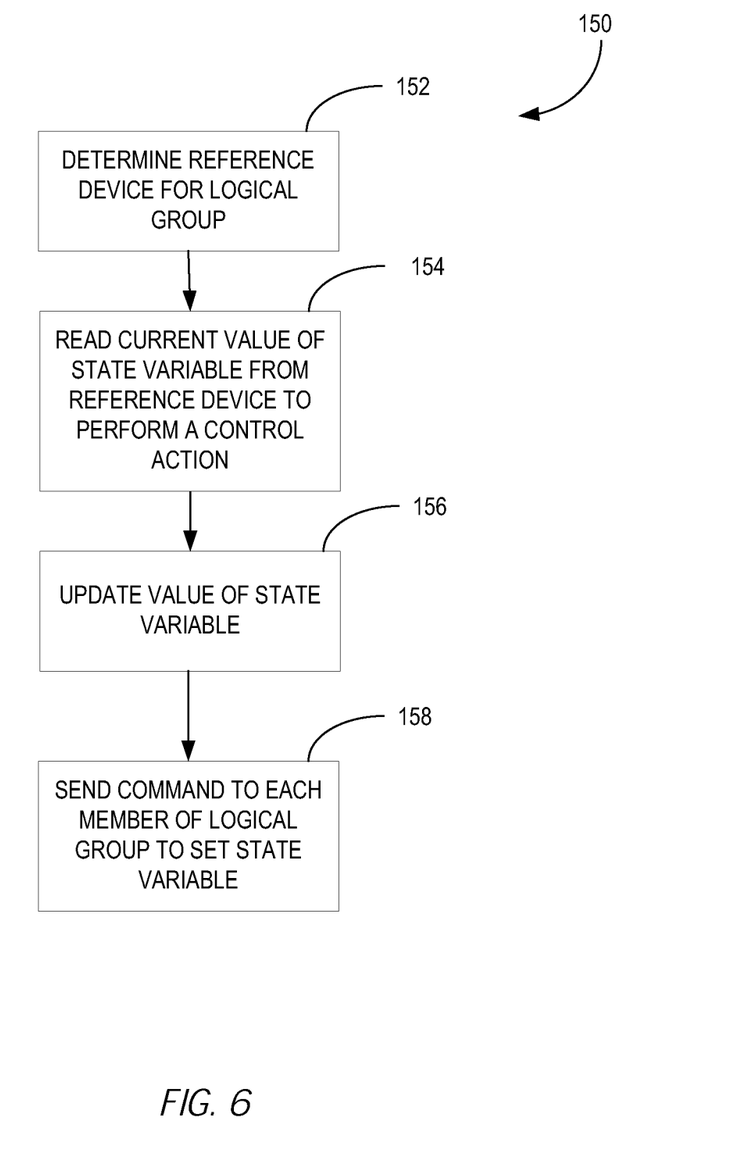
FIG. 6 illustrates an exemplary data synchronization method for a control system where multiple controllers exercise control in a coordinated manner over a logical group of actuators and sensors.

FIG. 6 illustrates an exemplary method 150 executed by a controller 100 to update a state variable for a logical group 400 of actuators 200 and sensors 300. To start the procedure, the controller 100 determines the actuator 200 or sensor 300 that is serving as the reference device for a logical group 400 (block 152). As previously noted, in one example the reference device may comprise the actuator 200 or sensor 300 with the lowest network address. The controller 100 then reads the current value of the state variable from the reference device (block 154), which may be used to perform a control action. The controller 100 may then calculate a new value for the state variable (block 156). When the new value is determined, the controller 100 sends a Set State command to each actuator 200 and sensor 300 in the logical group to update the state variable (block 158).

Figure 7:
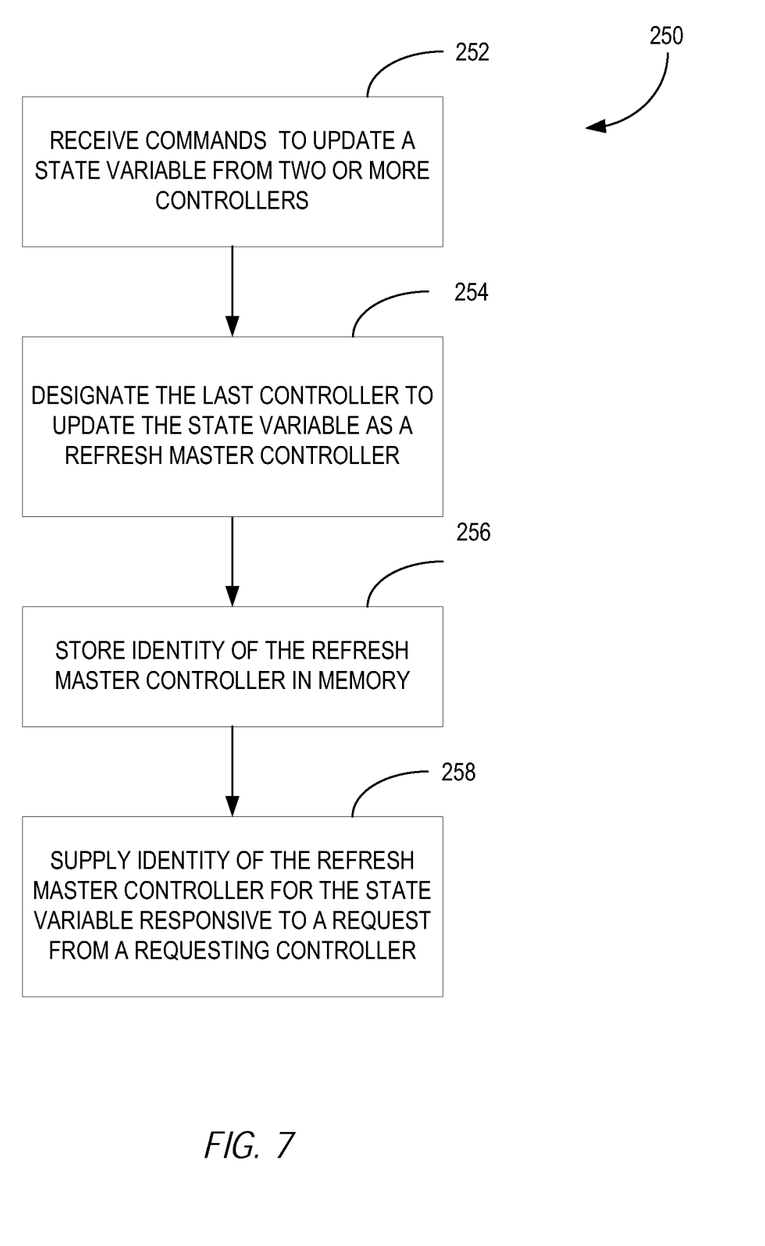
FIG. 7 illustrates an exemplary method of selecting a refresh master controller responsible for data synchronization.

FIG. 7 illustrates an exemplary method 250 implemented by an actuator 200 or sensor 300 for selecting the refresh master controller. The actuator 200 or sensor 300 receives commands at different times to update a state variable from a plurality of controllers 100 (block 252). The actuator 200 or sensor 300 designates the last controller 100 to update the state variable as the refresh master controller (block 254). The actuator 200 or sensor 300 stores the identity of the refresh master controller in memory of the actuator 200 or sensor 300 (block 256). Thereafter, the actuator 200 or sensor 300 supplies the identity of the refresh master controller to a requesting controller 100 that sends a request to the actuator 200 or sensor 300 for the identity of the refresh master controller (block 258).

Figure 8:
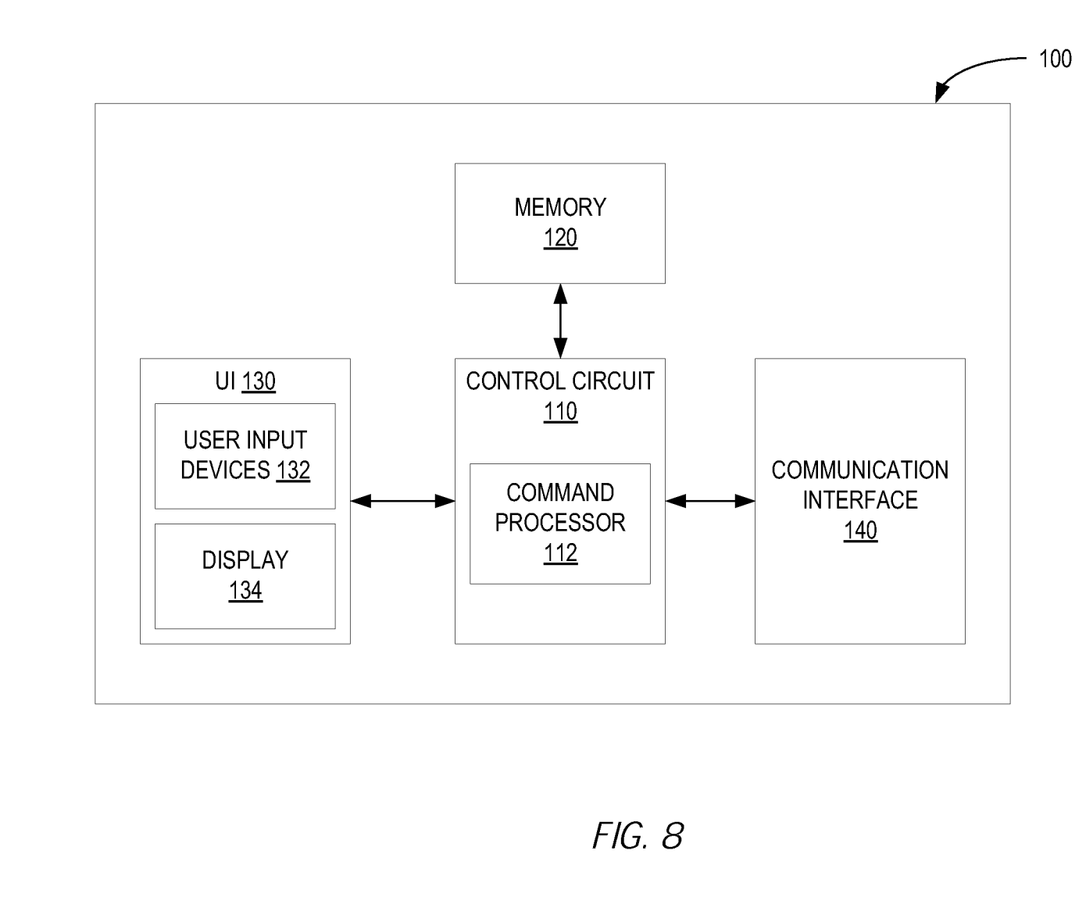
FIG. 8 illustrates an exemplary controller configured to implement the data synchronization methods herein described.

FIG. 8 illustrates an exemplary controller 100 for performing data synchronization as herein described. Controller 100 comprises a control circuit 110, memory 120, a user interface 130, and a communication interface 140. The control circuit 110 controls the operation of the controller as previously described. The control circuit 110 may be implemented by one or more processors, hardware circuits, firmware, or a combination thereof. The control circuit 110 includes a command processor 112 that is configured to determine the logical groups and corresponding reference devices, read the current values of the state variables from the reference device, and send commands to the actuators 200 and sensors 300 in a logical group 400 to update or refresh the state variables as described above.

Memory 120 stores program instructions and data needed by the control circuit 110 to perform its functions. Memory 120 also stores a table with the logical groups and the corresponding reference devices. For example, the table may include the group identifier, and addresses of the group members including the reference device. Memory 120 may, for example, comprise a non-volatile memory device such an electrically erasable programmable read only memory (EEPROM), flash memory, or magnetoresistive random access memory (MRAM). A volatile memory device, such a random access memory (RAM), may also be used to store temporary data.

The user interface 130 comprises one or more user input devices 132 and a display 134 to enable a user to interact with the control system 10. The user input devices 132 may include a keypad or touch screen for entering data and commands. The display 134 may comprise a liquid crystal display (LCD) or touch screen display, that also functions as a user input device 132.

The communication interface 140 provides a connection to a local area network (LAN) and enables the controller 100 to communicate with the actuators 200 and sensors 300 in the control system 10. If the LAN comprises a wireline network, the communication interface 140 may comprise an Ethernet interface. Alternatively, the communication interface 140 may comprise a WiFi interface, BLUETOOTH interface, ZIGBEE interface, or other wireless radio interface to connect to a wireless access point (WAP) in the LAN.

Figure 9:
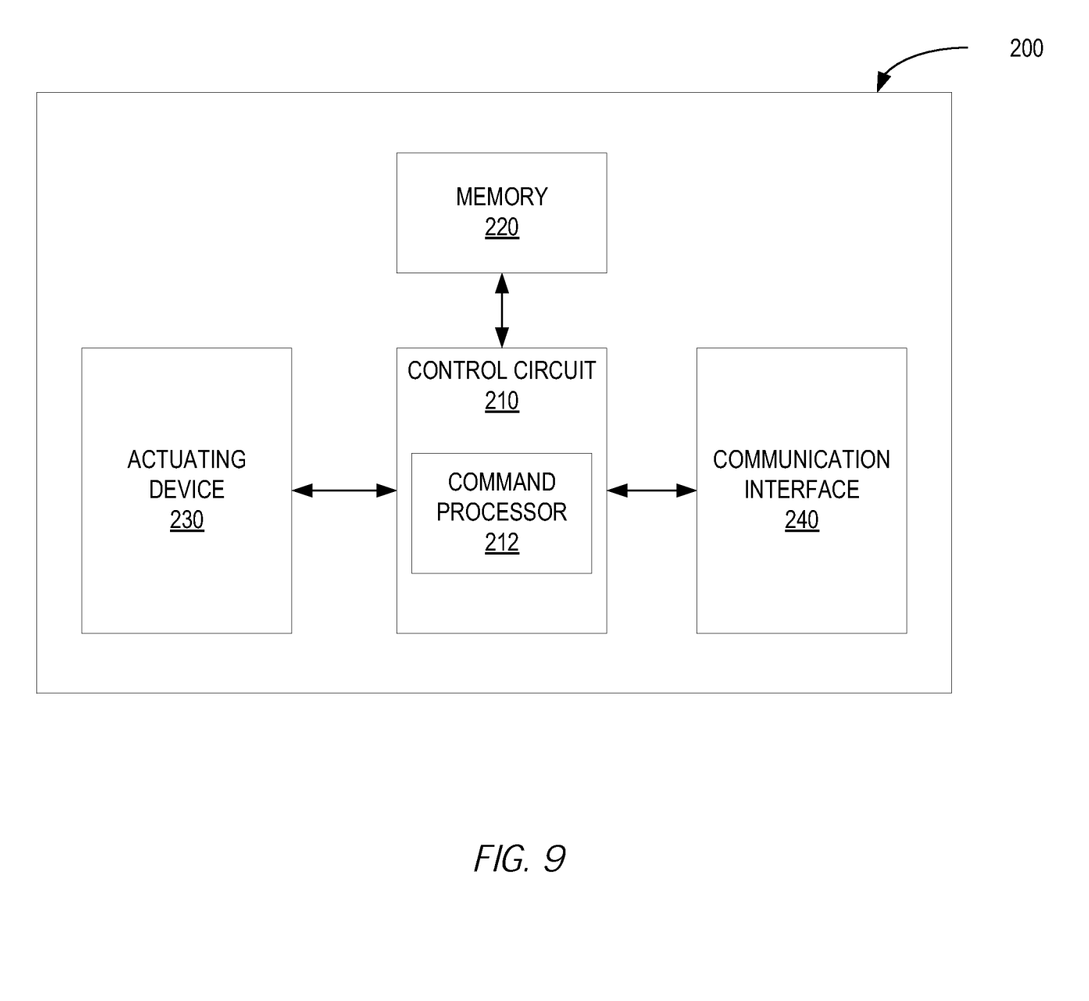
FIG. 9 illustrates an exemplary actuator in a logical group.

FIG. 9 illustrates the main functional elements of an actuator 200. The actuator 200 comprises a control circuit 210, memory 220, an actuating device 230, and a communication interface 240. The control circuit 210 controls the operation of the actuator 200 as previously described. The control circuit 210 may be implemented by one or more processors, hardware circuits, firmware, or a combination thereof. The control circuit 210 includes a command processor 212 to receive and execute command from the controllers 100. If the actuator 200 serves as a reference device, the command processor 212 also determines which controller 100 is the refresh master controller.

Memory 220 stores program instructions and data needed by the control circuit 210 to perform its functions. Memory 220 also stores the current values of state variables of the actuator 200. If the actuator 200 serves as a reference device, the memory 220 also stores the identity of the refresh master controller. Memory 220 may, for example, comprise a non-volatile memory device such an electrically erasable programmable read only memory (EEPROM), flash memory, or magnetoresistive random access memory (MRAM). A volatile memory device, such a random access memory (RAM), may also be used to store temporary data.

The actuating device 230 comprises a control device that is used to control a process. As one example, the actuating device 230 may comprise an on/off switch to control the power to a component in a process. In a residential heating system, an on/off switch can be used to control the supply of power to heating elements, fans, or other devices in the process. In this case, the state of the switch may comprise one of the state variables that are controlled by the controllers 100.

The communication interface 240 provides a connection to a local area network (LAN) and enables the actuator 200 to communicate with the controllers 100 in the control system 10. If the LAN comprises a wireline network, the communication interface may comprise an Ethernet interface. Alternatively, the communication interface 240 may comprise a WiFi interface, BLUETOOTH interface, ZIGBEE interface, or other wireless radio interface to connect to a wireless access point (WAP) in the LAN.

Figure 10:
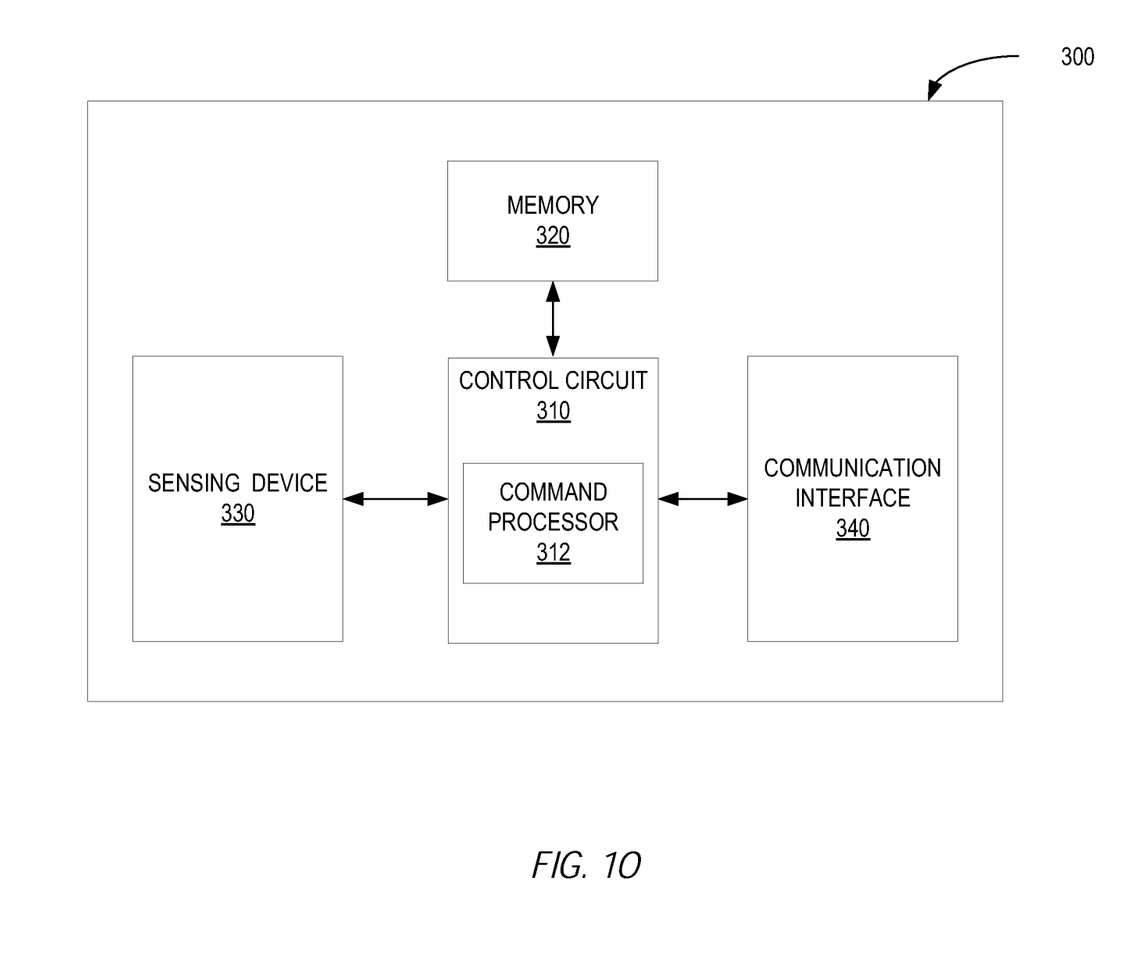
FIG. 10 illustrates an exemplary sensor in a logical group.

FIG. 10 illustrates the main functional elements of a sensor 300. The sensor 300 comprises a control circuit 310, memory 320, a sensing device 330, and a communication interface 340. The control circuit 310 controls the operation of the sensor 300 as previously described. The control circuit 310 may be implemented by one or more processors, hardware circuits, firmware, or a combination thereof. The control circuit 310 includes a command processor 312 to receive and execute command from the controllers 100. If the sensor 300 serves as a reference device, the command processor 312 for the reference device also determines which controller 100 is the refresh master controller.

Memory 320 stores program instructions and data needed by the control circuit 310 to perform its functions. Memory 320 also stores the current values of the state variables for the sensor 300. If the sensor 300 serves as a reference device, the memory 320 also stores the identity of the refresh master controller. Memory 320 may, for example, comprise a non-volatile memory device such an electrically erasable programmable read only memory (EEPROM), flash memory, or magnetoresistive random access memory (MRAM). A volatile memory device, such a random access memory may also be used to store temporary data.

The sensing device 330 comprises any type of transducer that senses a parameter of the controlled process and generates an electrical signal indicative of the current value of the parameter. As one example, the sensing device 330 may comprise a temperature transducer to measure the temperature. In a residential heating system, a temperature transducer can be used to measure the temperature in a room and report the temperature to the controllers 100.

The communication interface 340 provides a connection to a local area network (LAN) and enables the sensor 300 to communicate with the controllers 100 in the control system 10. If the LAN comprises a wireline network, the communication interface 340 may comprise an Ethernet interface. Alternatively, the communication interface 340 may comprise a WiFi interface, BLUETOOTH interface, ZIGBEE interface, or other wireless radio interface to connect to a wireless access point (WAP) in the LAN.

The data synchronization methods and procedures described above give effective control over a state variable to a master controller without direct interaction between controllers. This data synchronization scheme is advantageous in control systems where controllers are likely to be added and removed for extensibility and scalability. An example is a residential heating control system that has a low cost configuration to which consumers can add additional controllers to extend the functionality of the system.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of updating a state variable implemented by a controller in a distributed control system having multiple controllers, said method comprising:
    determining, by the controller, a reference device for a logical group of actuators and sensors,
    wherein said reference device is one of said actuators and sensors of said logical group and wherein a current state for any of the actuators or sensors within the logical group is determined by reading a current value of a state variable shared by all of the actuators and sensors of the logical group from the reference device;
    reading, by the controller, a current value of the state variable from the reference device in the logical group to perform a control action;
    calculating, by the controller, a new value for the state variable;

sending, by the controller, a command to each actuator and sensor in the logical group to set the state variable to the new value, wherein a state of the state variable is subject to control by a plurality of the multiple controllers;

periodically sending a refresh command to each actuator and sensor in the logical group to set the state variable to a predetermined state; and verifying that the controller is designated as a refresh master controller for the state variable before sending the refresh command.

2. The method of claim 1 wherein verifying that the controller is a refresh master controller for the state variable comprises sending a request message to the reference device and receiving a response message from the reference device indicating whether the controller is the refresh master controller.

3. The method of claim 1 wherein determining a reference device for a logical group comprises identifying the actuator or sensor with the lowest network address as the reference device.

4. A controller in a distributed control system, said controller comprising:
   a communications interface for communicating over a network with a plurality of distributed actuators and sensors in a logical group; and
   a command processor configured to:
   determine a reference device for a logical group of actuators and sensors,
   wherein said reference device is one of said actuators and sensors of said logical group and wherein a current state for any of the actuators or sensors within the logical group is determined by reading a current value of a state variable shared by all of the actuators and sensors of the logical group from the reference device;
   read a current value of the state variable from the reference device in the logical group to perform a control action;
   calculate a new value for the state variable;
   send a command to each actuator and sensor in the logical group to set the state variable to the new value,
   wherein a state of the state variable is subject to control by a plurality of the multiple controllers;
   periodically send a refresh command to each actuator and sensor in the logical group to set the state variable to a predetermined state; and
   verify that the controller is designated as a refresh master controller for the state variable before sending the refresh command.

5. A method of data synchronization in a distributed control system having multiple controllers, said method comprising:
   assigning a set of actuators and sensors to a logical group having one or more shared state variables,
   wherein each of the actuators and sensors in the set is controlled by a plurality of the multiple controllers;
   assigning one of the actuators and sensors to serve as a reference device for the logical group of actuators and sensors;
   determining, by one of the multiple controllers, a current state for any of the actuators or sensors within the logical group by reading a current value of at least one of the one or more shared state variables from the reference device to perform a control action; and
   designating a selected one of the controllers as a refresh master controller for the state variables, and storing an identity of the refresh master controller in memory of the reference device.

6. The method of claim 5 further comprising periodically sending a refresh command from the refresh master controller to each of the actuators and sensors in the logical group to synchronize the states of the actuators and sensors.

7. A distributed control system comprising:
   a plurality of actuators and sensors assigned to a logical group that shares one or more common state variables; and
   a plurality of distributed controllers each for controlling each of the plurality of sensors and actuators of the logical group, wherein the plurality of controllers are configured to:
   assign one of the actuators and sensors to serve as a reference device for the logical group of actuators and sensors;
   determine a current state for any of the actuators or sensors within the logical group by reading a current value of at least one of the one or more shared state variables from the reference device to perform a control action; and
   designate a selected one of the controllers as a refresh master controller for the state variables, and store an identity of the refresh master controller in memory of the reference device.

* * * * *